United States Patent
Correll et al.

(10) Patent No.: US 6,414,103 B1
(45) Date of Patent: Jul. 2, 2002

(54) COATING POWDERS COMPRISING MACROCYCLIC OLIGOMERS

(75) Inventors: Glenn D. Correll, Birdsboro; Tina L. Tullos; Gordon L. Tullos, both of Reading, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/671,803

(22) Filed: Sep. 28, 2000

Related U.S. Application Data

(62) Division of application No. 09/467,407, filed on Dec. 20, 1999.

(51) Int. Cl.[7] .................. C08G 63/00; C08G 69/00; C08G 77/00; C08F 2/46
(52) U.S. Cl. .................. 528/25; 528/26; 528/288; 528/298; 528/307; 528/308; 528/330; 528/331; 528/370; 528/344; 528/346; 528/347; 528/323; 522/104; 522/148; 522/176; 522/179; 522/183; 522/172
(58) Field of Search ............... 522/176, 179, 522/183, 162, 163, 164, 104, 107, 148; 528/288, 298, 304, 305, 306, 307, 308, 310, 322, 323, 330, 331, 370, 344, 346, 347, 25, 26

(56) References Cited

U.S. PATENT DOCUMENTS

| | | | | |
|---|---|---|---|---|
| 4,180,652 A | * | 12/1979 | Nogami et al. | |
| 4,195,159 A | * | 3/1980 | Kwiecinski | |
| RE34,431 E | * | 11/1993 | Brunelle et al. | |
| 5,306,806 A | * | 4/1994 | Tanabe et al. | |
| 5,880,223 A | * | 3/1999 | Shah et al. | |

FOREIGN PATENT DOCUMENTS

| WO | WO 9925485 | 5/2000 |
|---|---|---|

OTHER PUBLICATIONS

Bruenlle Daniel J.; Bradt Jeana E.; Serth–Guzzo Judith; Takekoshi Tohru; Evans Thomas L.; Pearce Eric J. Semicrystalline Polymers via Ring–opening Polymerization: Preparation and Polymerization of Alkylene Phthalate Cyclic Oligomers—*Polymer Preprints* vol. 38, No. 2, p. 381, 1997.

Liu Zhenguo; Paris Henry G.; Liotta Charles L.; Eckert Charles A. Preparation of Cyclic Polyester Oligomers and Ultra–low Polyester VOC Polyester Coatings—*Polymer Reprints*, vol. 40, No. 1, p. 137, 1999.

* cited by examiner

*Primary Examiner*—Susan W. Berman

(57) ABSTRACT

A coating powder comprising a macrocyclic oligomer and a ring-opening polymerization agent is applied to an article, fused, and converted to a linear polymer at a temperature of from about 160 to about 400° C. The powder has the low melt viscosity and friability of a thermoset powder but is converted at high fusing temperatures to a tough coating having the good impact resistance and good elongation of a thermoplastic powder. The oligomer is a polyester, polycarbonate, polyamide, polyimide, polyamideimide. The article may be coated electrostatically or in a fluidized bed.

7 Claims, No Drawings

COATING POWDERS COMPRISING MACROCYCLIC OLIGOMERS

This is a divisional application of co-pending application Ser. No. 09/467,407, filed Dec. 20, 1999.

BACKGROUND OF THE INVENTION

This invention relates to new materials for making coating powders. It also relates to a new method for applying a powder coating to an article. It further relates to a powder coating system wherein a macrocyclic oligomer in a coating powder is converted to a high molecular weight linear or crosslinked polymer as the coating powder is heated. It further relates to the coating powder, itself, and particularly to the fluidized-bed method for coating sheet metal and other articles of manufacture.

Traditionally, coating powders have been made by the extrusion of a mixture of resins, curing agents, pigments, fillers, etc. to obtain a homogeneous mixture, cooling and grinding the extrudate, and screening the comminuted product to obtain the desired particle size distribution.

It is well known that the physical properties of a polymer improve and that the melt viscosity of the polymer increases as the molecular weight increases. In the powder coating art, the viscosity of the binder resin should be low at the application temperatures but the resin must solidify at the end of the process. The molecular weight and melt viscosity of thermoplastic polymers are just as high after application as they are before. Thermosetting polymers may have very low melt viscosities when applied but do solidify when cured.

The binder resin in a coating powder should have a low melt viscosity, good adhesion to the substrate, good impact resistance, and toughness. The toughness of thermoplastic resins makes them attractive as coatings, especially when lightly crosslinked but still thermoplastic. The extremely high melt viscosity of high molecular weight thermoplastic polymers, however, has been compared to that of cold molasses. Cryogenic grinding of thermoplastic resins is generally necessary because of their very nature; they are otherwise difficult to grind because of the problem of heat dissipation. Attempts to improve their melt-flow characteristics by lowering their molecular weight or plasticizing them have harmed the physical properties of thermoplastic resins.

Most thermoplastic coating powders are applied at 200–300° C., short residence times permitting what otherwise might well be above their upper temperature limit. Polyesters and polyamides are among the principal thermoplastic resins used in coating powders. Typically, the polyesters melt or soften at 160–170° C. and substrates are preheated to about 300° C. Polyamides have higher melt temperatures (~186° C.) and application temperatures (~310° C.).

Thermosetting resins, on the other hand, are brittle solids having low melt viscosities. The low viscosity of thermosetting resins promotes good flow out of fused coating powders containing them. Smooth thin films result. Also, the brittle solids can be ground to fine powders without the cost of cryogenic grinding. Although the variety of thermosetting powders is large and growing, the variety is limited by the fact that they are usually cured by addition reactions rather than by condensation because of the voids in a cured film that arise from trapped by-products. The curing temperature of thermosetting resin based powder coatings ranges from 135 to 240° C.

SUMMARY OF THE INVENTION

It is an object of this invention, therefore, to provide a novel coating powder having the low melt viscosity and friability of a thermoset powder but which is converted at high fusing temperatures to a tough coating having the good impact resistance and good elongation of a thermoplastic powder.

It is a related object of this invention to provide a novel crosslinked powder coating.

It is a related object of this invention to provide a novel method for powder coating an article.

It is related object of this invention to provide a novel method for the fluidized-bed coating of sheet metal and other articles of manufacture.

DETAILED DESCRIPTION OF THE INVENTION

These and other objects which will become apparent from the following description are achieved by a method for coating an article comprising applying a coating powder comprising a macrocyclic oligomer selected from the group consisting of polyesters, polycarbonates, polyamides, polyimides, polyamideimides, a ring-opening polymerization agent, and optionally, a photoinitiator, to the article, fusing the powder and causing the fused powder to flow across the surface of the article, and converting the oligomer to a thermoplastic or thermosetting polymer.

Thus, the coating powder of this invention may contain a wide variety of macrocyclic oligomers, the structures, preparation, and polymerization of which are described hereinafter in the order given above.

For the purposes of this invention, coating powder means the material and powder coating means the process or the applied film as the context requires.

As used herein, the term ring-opening polymerization agent includes agents that act catalytically (i.e., catalysts) and agents that open a macrocyclic ring by reaction, e.g., a lactam and basic reagent for a macrocyclic polyamide, or a metal sulfide for a macrocyclic polyimide used in this invention.

As used herein, the term macrocylic oligomer includes compounds in which spiro(bis)indane groups are part of a larger ring structure. The mere fact that the spirobiindane moiety is itself cyclic is not significant to the macrocyclic nature of the compound; rather, the presence of a larger ring structure is mandatory.

Polyesters

In one embodiment of this invention, the coating powder comprises a macrocyclic polyester oligomer and a ring opening polymerization catalyst, each as described hereinbelow.

Macrocyclic polyester oligomers suitable for this invention may be obtained in relatively high yields, typically 15–75%, by the reaction of a diol with a diacid chloride in the presence of a non-sterically hindered amine as a catalyst, under anhydrous conditions and at relatively low temperatures in the presence of a substantially water-immiscible organic solvent at a temperature of from −25° to +25° C. The macrocyclic polyester oligomers thus prepared have degrees of polymerization from 2 to about 12 and are usually predominantly dimer, trimer, tetramer and pentamer. Said oligomers comprise structural units of Formula I:

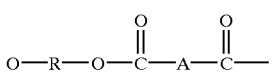

wherein R is an alkylene or mono-or polyoxyalkylene radical containing a straight chain of about 2–8 carbon atoms and A is an m- or p-linked monocyclic aromatic or alicyclic radical, or a saturated or unsaturated aliphatic radical having from 2 to 10 carbon atoms.

The diols are exemplified by ethylene glycol, propylene glycol, tetramethylene glycol, hexamethylene glycol, neopentylene glycol, diethyleneglycol and triethylene glycol. The A radical of the diacid chloride is exemplified by the m- and p-phenylene radicals, substituted derivatives thereof, cyclohexylene, cyclopentylene, ethylene, octylene, decylene, and ethenylene radicals. The acids are exemplified by fumaric, maleic, octanoic, decanoic, and dodecanoic acids.

The amines are exemplified by N-methyl heterocyclic monoamines such as N-methyl-pyrrolidine and N-methylpiperidine, and polycyclic compounds with a tertiary nitrogen in the bridgehead position, as illustrated by quinuclidine and 1,4-diazabicyclo[2.2.2]octane (DABCO)

As organic solvents, various water-immiscible non-polar organic liquids may be employed. Illustrative liquids of this type are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane; methylene chloride being particularly suitable. It is advantageous to employ, in combination with the water-immiscible solvent, a more polar combined oxygen-containing solvent such as tetrahydrofuran in which the diol is soluble to facilitate dissolution thereof.

The molar ratio of diol to acid chloride is about 1:1. The amine is employed in amounts approximating those of the diol and diacid chloride combined rather than in catalytic amounts. Formation of an acylammonium salt by reaction of the amine with the diacid chloride is apparently a step in the process. Typical molar ratios of amine to combination of diol and diacid chloride are in the range of about 1.0–1.5:1, for example, 1.25:1.

The proportion of solvent employed in the reaction is not critical. In general, highest yields are obtained at concentrations of diol and diacid chloride in the range of about 0.1–0.5M.

The precise order of addition of reagents is not critical, except that the amine and diacid chloride should be prevented from coming into contact with each other prior to contact with the diol. This is necessary because the acylammonium salt which is thus formed undergoes nearly immediate decomposition by nucleophilic displacement of nitrogen from a carbon atom by the chloride ion also present in the said salt.

Thus, the diol, diacid chloride and amine may be introduced simultaneously into the reaction vessel, with the amine being introduced either separately or in admixture with the diol. The diol and diacid chloride may be introduced separately or in admixture into a reaction vessel which already contains the amine.

It is essential that the reaction conditions be substantially anhydrous. The presence of an appreciable amount of water will cause hydrolysis of the diacid chloride or the acylammonium salt to produce carboxylic acid which may then undergo dehydration to an anhydride. Such hydrolysis will naturally decrease the yield of cyclic polyester oligomer.

The temperature is from about −25° to about 5° C., often from about −10° to 0° C. At temperatures below about −25° C., the process becomes impractical by reason of an extremely low reaction rate. At temperatures above +25° C., side reactions dominate; they may include decomposition of the acylammonium salt and reaction of the amine with chlorinated aliphatic hydrocarbon used as solvent, to form quaternary ammonium salts. Yields are maximized at temperatures no higher than about 5° C.

When the solvent is a chlorinated aliphatic hydrocarbon or similar material containing highly nucleophilic substituents, it is generally advisable to introduce the diol, diacid chloride and amine simultaneously as previously described, so as to ensure contact between the amine and diacid chloride before the former comes into possible reactive contact. Reaction of the amine with the solvent may be relatively rapid if the temperature rises above 5° C.

The above method may be modified by adding a stoichiometric acid-accepting amount of another tertiary amine selected from the group consisting of trialkylamines and heteroaromatic tertiary amines. Suitable amines for this purpose generally comprise those which are oleophilic; i.e., which are soluble in and highly active in organic media, especially those mentioned above. More particularly, said amines generally include those known to be useful in the preparation of polycarbonates. They include trialkylamines in which the alkyl groups contain about 1–6 carbon atoms, such as triethylamine, tri-n-propylamine, diethyl-n-propylamine and tri-n-butylamine, and heterocyclic amines such as pyridine and 4-dimethylaminopyridine (which, for the purposes of this invention, contain only one active amine group). The most useful amines of this type are trialkylamines containing no branching on the carbon atoms in the 1- and 2-positions, especially tri-n-alkylamines in which the alkyl groups contain up to about 4 carbon atoms, such as triethylamine.

The molar ratio of diol to diacid chloride in this modified method is about 1:1. Molar ratios of total amines to diol-diacid chloride combination are usually in the range of about 1.0–1.25:1. About 1–25 mole percent, often about 3–8 mole percent, of total amines is usually unhindered amine, the balance being other tertiary amines.

This method does not require extraordinary purification efforts for the diol, solvents and other tertiary amine. Purity is, however, an issue with the unhindered amine and diacid chloride. The former should be highly purified, typically by sublimation in the case of DABCO. The latter should be substantially free, both before and during the reaction, from carboxylic acid formed by hydrolysis. Thus, it is essential that the reaction conditions be substantially anhydrous to prevent hydrolysis of said diacid chloride and also of the acylammonium salt described hereinabove.

Close temperature control is generally not necessary when the trialkylamines and heteroaromatic tertiary amines are used. In general, the initial combination of the reagents should take place below 10° C. and often in the range of −5° to +5° C. The temperature may rise, however, to a maximum of about 40° C. as the exothermic reaction occurs.

Another method for producing macrocyclic polyester oligomers suitable for making the coating powders of this invention comprises the step of heating a mixture of a linear polyester, an organic solvent, and a tin catalyst and does not require the use of amines and corrosive acid halides such as terephthaloyl chloride. Yields of up to about 90% or more are obtained.

The linear polyesters are commercially available and often prepared by the alcoholysis of esters of phthalic acid with a glycol and subsequent polymerization which is achieved by heating the resulting mixture in the presence of an ester interchange catalyst.

The organic solvents that may be employed are well known and commercially available and they include those having a boiling point of at least about 110° C. Illustrative examples of the organic solvents that may be employed in the instant invention include chlorobenzene, xylene, naphthalene, toluene, tetramethylbenzene, methylnaphthalene, o-dichlorobenzene and mixtures thereof.

There is no limitation with respect to the tin catalysts which may be employed other than that they are organotin compounds having at least one tin atom bonded to two carbon atoms and one or two oxygen atoms. They are exemplified by dialkyltin oxides and dialkyltin alkoxides.

The dialkyltin oxides have the formula $(R^2)_2-Sn=O$, and the dialkyltin alkoxide catalysts have the formula $(R^2)_2-Sn-(O-R^3)_2$ wherein each $R^2$ is independently a $C_{1-10}$ alkyl group such as a butyl groups or an octyl group. Each $R^3$ is independently a $C_{1-10}$ branched or unbranched hydrocarbon or together, each of the two $R^3$ groups form divalent aliphatic unsubstituted or substituted hydrocarbon radicals wherein the hydrocarbon radicals can include olefinic radicals and the substituted radicals can include fused rings.

This process for producing macrocyclic polyester oligomers from linear polyesters does not require extremely dilute conditions in order to produce respectable yields of the desired products. The concentration of the solution may be less than about 0.30 M, often less than about 0.20M and more often less than about 0.10M, based on the structural unit of the polymer.

Typically, any temperature that results in the dissolution of the linear polyesters in the solvent may be employed in this modified method. The temperature may be from about 140° C. to about 240° C. but often from about 180° C. to about 230° C. and more often from about 190° C. to about 215° C.

The amount of catalyst employed in this method for converting a linear polyester to a macrocyclic oligomer is usually from about 1.0 to about 5.0 mole percent tin for every polyester monomer unit and often from about 2.0 to about 3.0 mole percent tin for every polyester monomer unit.

When conducting this method, the linear polyesters are added to the solvent. Stirring may be employed to induce solution and pressure may be varied to optimize reaction conditions. The catalyst can be added as a solid or as a solution to the mixture. Heat may be supplied prior to, during or after the additions. Equilibrium is typically observed in the resulting product solution within 2 hours and often from about 30 minutes to about 2 hours. The resulting macrocyclic polyester oligomers can be separated from the product solution by cooling said product solution to between about 50° to about 100° C., often between about 60° C. to about 80° C., to induce precipitation of the linear polyester followed by filtering. The macrocyclic polyester oligomers are recovered by evaporation of the resulting filtrate to remove any remaining solvent. The recovered macrocyclic polyester oligomers are often at least about 90 percent pure.

In contrast to the above methods, high dilution conditions (actual or simulated) and relatively high temperatures are used to make macrocyclic polyester oligomers suitable for use in this invention when substantially equimolar proportions of the disodium salt of a bisphenol and a dicarboxylic acid chloride are reacted in the presence of a tertiary amine or quaternary ammonium salt. The predominant oligomer is usually the trimer but the product generally comprises mixtures of oligomers, principally having degrees of polymerization up to about 7. The general structure of macrocyclic polyester oligomers prepared by said method is represented by Formula II:

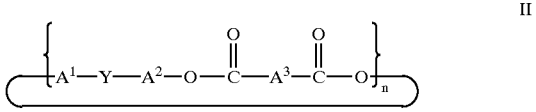

wherein each $A^1$ and $A^2$ is a monocyclic divalent or trivalent aromatic radical, $A^3$ is a saturated or unsaturated divalent aliphatic radical having from 2 to 10 carbon atoms or m- or p-linked monocyclic aromatic or alicyclic radical, Y is a single bond or divalent, trivalent, or tetravalent bridging group and n is from 2 to about 7.

The monocyclic aromatic radicals represented by $A^1$ and $A^2$ are usually unsubstituted but may be substituted with such groups as alkyl, alkenyl, alkoxy, halo (especially chloro and/or bromo), and nitro. Depending on the valence of Y, $A^1$ and $A^2$ will both be divalent, one divalent and the other trivalent, or both trivalent. Y is usually a divalent or tetravalent bridging group.

$A^3$ may be an aromatic radical similar to $A^1$ and $A^2$ with the proviso that it is m- or p-linked. The alicyclic radicals are similarly linked and most often contain about 4–8 carbon atoms. The $A^3$ radicals may be considered as being derived from a dicarboxylic acid of the formula $A^3(COOH)_2$. Thus, suitable dicarboxylic acids include adipic, pimelic, fumaric, maleic, and cyclohexane-1,3-dicarboxylic acids and the unsubstituted and substituted terephthalic, isophthalic and pyridine-2,6-dicarboxylic acids. The unsubstituted aromatic acids, especially isophthalic and terephthalic and most especially isophthalic acid, are often used.

Macrocyclic polyester oligomers suitable for use in the coating powders of this invention are derived from bisphenols of the formula:

$$HO-A^1-Y-A^2-OH$$

wherein Y, $A^1$ and $A^2$ are divalent. The following bisphenols are illustrative.
4,4'-Dihydroxybiphenyl
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-b-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane 2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3,5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)
  propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl)ether
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane
  ("SBI")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

In the process outlined immediately above, the amount of catalyst is 0.1–5.0 mole percent based on the the bisphenol. Triethylamine is particularly suitable among the tertiary amines but when the salt of the bisphenol is added as an aqueous solution, the quaternary ammonium salts function as phase transfer catalysts. As mentioned above, the reagents are maintained in contact under conditions of low concentration, either actual high dilution conditions requiring large proportions of the organic liquid or simulated high dilution conditions known to those skilled in the art. The dicarboxylic acid chloride has the formula $A^3(COCl)_2$. The reaction medium comprises a substantially non-polar organic liquid, exemplified by aromatic hydrocarbons such as toluene and xylene; substituted aromatic hydrocarbons such as chlorobenzene, o-dichloro-benzene and nitrobenzene; and chlorinated aliphatic hydrocarbons such as chloroform, methylene chloride, trichloroethane and tetrachloroethane, and mixtures of the foregoing with ethers such as tetrahydrofuran.

The reaction temperature is in the range of about 25–100° C.; the yield of cyclics is often increased at the higher temperatures, typically 50–100° C. The desired cyclic polyester oligomers, however, are generally obtained in admixture with a large proportion of linear polyesters. The cyclics are soluble in solvents such as methylene chloride and may be isolated from the linears by filtration and evaporation of the solvent.

Compounds containing spiro(bis)indane moieties of Formula III:

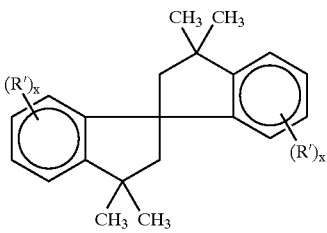

wherein each R' is independently $C_{1-4}$ primary or secondary alkyl or halo and x is 0–3, are uniquely and generically capable of forming a broad spectrum of macrocylic oligomers, often in preference to linear polymers. For this reason, a somewhat simpler procedure can be used for the preparation of macrocyclic polyester oligomers from the spiro(bis)indane bisphenol called SBI. In such a procedure, the dicarboxylic acid chloride is added to a mixture of the aforementioned organic liquid and a dilute aqueous solution of a di-(alkali metal) salt of SBI in the presence of a quaternary ammonium salt. The reaction temperature is from 25 to 100° C., typically 30–50° C.

For the preparation of macrocyclic copolyesters, there may also be employed a second salt of an aliphatic, alicyclic, or aromatic dihydroxy compound. Said second salt may be in the same vessel as the spirobiindane bisphenol salt or may be added concurrently with the dicarboxylic acid chloride, with the former method frequently affording somewhat higher yields of macrocyclic copolyesters.

In this embodiment of the invention, the ring opening polymerization catalyst is exemplified by basic reagents, tin alkoxides, organotin compounds (i.e., compounds containing a Sn—C bond), titanate esters and metal acetylacetonates.

Suitable basic reagents include alkali metal hydroxides, alkali metal salicylates, alkali metal alkoxides and phenoxides, and phosphines. Illustrative hydroxides include lithium hydroxide and sodium hydroxide. Illustrative salicylates are lithium salicylate, sodium salicylate and potassium salicylate, with lithium salicylate generally being preferred. Illustrative alkoxides are the lithium, sodium and potassium $C_{1-4}$ alkoxides. Lithium and sodium phenoxides are also illustrative. The phosphines include triphenylphosphine and substituted triphenylphosphines, particularly those containing electron-donating substituents such as tris (p-methoxyphenyl) phosphine.

Illustrative tin alkoxides contain $C_{1-4}$ alkyl groups, as exemplified by stannous methoxide, ethoxide and propoxides. Illustrative organotin compounds are dialkyltin(IV) oxides such as di-n-butyltin(IV) oxide and di-n-octyltin(IV) oxide, as well as di-alkyltin(IV) dialkoxides such as di-n-butyltin(IV) di-n-butoxide and heterocyclic analogs thereof such as 2,2-di-n-butyl-2-stanna-1,3-dioxacycloheptane.

Said titanate esters are exemplified by isopropyl titanate, 2-ethylhexyl titanate, and tetraalkyl titanates such as tetraethyl, tetrabutyl, and tetraoctyl titanate, and compounds having at least one moiety of Formula IV:

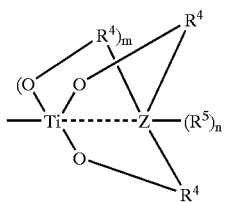

or of Formula V:

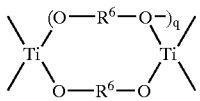

wherein each $R^4$ is independently $C_{2-3}$ alkylene; Z is O or N; $R^5$ is $C_{1-6}$ alkyl or unsubstituted or substituted phenyl; each $R^6$ is independently $C_{2-6}$ alkylene; when Z is O, m=n=0, and when Z is N, m=0 or 1 and m+n=1; and q is 0 or 1.

Certain commercially available compounds such as isopropyl triethanolaminato-titanate, which is sold by DuPont under the trademark "TYZOR TE" as a solution in isopropyl alcohol are suitable. To maximize polyester molecular weight, it is usually preferred to replace the alcohol with an inert solvent such as xylene by introducing the inert solvent and removing the alcohol by distillation.

In the moieties of formula V, two titanium atoms are joined by one or two —O—$R^6$—O— moieties, forming a cyclic structure when q is 1. The free valence bonds in formulas IV and V are most often bound to $C_{1-10}$ and especially $C_{6-10}$ alkoxy groups, including n-propoxy, isopropoxy, n-hexyloxy, n-octyloxy, n-decyloxy and 2-ethylhexyloxy.

Titanate ester compositions useful as initiators may be prepared by the reaction of at least one tetraalkyl titanate with polyhydroxy reagents such as 1,4-butanediol, diethylene glycol, methyldiethanolamine and phenyldiethanolamine. The reaction may be conducted at temperatures in the range of about 80°–150° C., typically in the-presence of a solvent such as xylene or o-dichlorobenzene. Reactant ratios may be adjusted to provide the desired proportions of moieties of formulas IV and V. Compositions comprising compounds having alkoxy groups bound to titanium may be prepared by employing less than a stoichiometric amount of dihydroxy compound. An inert atmosphere such as nitrogen or argon is generally preferred.

The metal acetylacetonates are illustrated by ferric acetylacetonate and cobalt(III) acetylacetonate. They are often advantageously employed in two-component catalyst systems in combination with an aliphatic alcohol, especially a diol such as 1,12-dodecanediol. The metal acetylacetonate and alcohol are generally employed in approximately equimolar proportions. Such two-component catalyst systems may be advantageous in situations where close control of the time of polymerization is necessary.

A coating powder of this invention containing said macrocyclic polyester oligomer and said ring-opening polymerization catalyst is converted to a powder coating at a temperature in the range of about 160°–300° C., preferably in the range of about 160°–250° C. The conversion takes place above the temperature at which the macrocyclic oligomer in the coating powder is completely melted. The conversion of macrocyclic poly(butylene terephthalate) oligomers to a linear polyester preferably is conducted at temperatures within the range of about 175°–200° C. The ring opening catalyst is typically present in the amount of about 0.01–2.0 and often about 0.05–1.0 mole percent based on structural units in the oligomers. In the case of catalysts containing more than one titanium atom, the mole percentage calculation is on the basis of a single titanium atom per molecule. The polymers prepared from said oligomers generally have weight average molecular weights in the range of about 10,000–150,000.

In another embodiment of this invention, from about 0.5 to about 100 mole percent of the bisphenol or other diol may be replaced in the reaction mixtures described by an unsaturated bisphenol such as diallyl bisphenol A to prepare a thermosettable macrocyclic oligomeric polyester for use in a coating powder of this invention.

An unsaturated macrocyclic polyester oligomer in a coating powder is converted to a crosslinked high molecular weight polyester in the powder coating by adding a photoinitiator effective to enable radiation curing of the polyester to the powder, fusing the powder to allow it to flow over the surface of the substrate and exposing the coating to ultraviolet radiation such as that emanating from one or more 600 watt V/H ultraviolet (UV) lamps for about 1 to 10 seconds. The 2,4,6-trimethylbenzoyldiphenyl phosphine oxide sold under the trademark LUCERIN TPO by BASF is an example of such a photoinitiator.

The unsaturated macrocyclic polyester oligomer in a coating powder may also be converted to a crosslinked high molecular weight polyester in the powder coating by adding a thermal initiator sufficient to enable thermal curing of the polyester to the powder, fusing the powder to allow it to flow over the surface of the substrate and heating the coating to about 200–300° C. A peroxide such as the LUPEROX 230XL catalyst sold by Elf Atochem is an example of the thermal initiator.

Polycarbonates

In another embodiment of this invention, the coating powder comprises a macrocyclic polycarbonate oligomer and a ring-opening polymerization catalyst, each as described hereinbelow.

Macrocyclic polycarbonate oligomers containing structural units of the formula: —O—$A^4$—O—C(=O)—, wherein $A^4$ is a spiro(bis)indane moiety of Formula III, and corresponding copolycarbonates, may be prepared by contacting a composition comprising at least one compound of Formula VI:

$$Y^2O—A^4—OY^2 \qquad \qquad VI$$

or a mixture thereof with at least one compound of Formula VII:

$$Y^3O—R^7—OY^3, \qquad \qquad VII$$

wherein $R^7$ is a divalent aliphatic radical or an m- or p-linked aromatic or alicyclic radical, and the $Y^2$ and $Y^3$ values in each compound are both H or (O=)C—Cl, with an oleophilic aliphatic or heterocyclic tertiary amine and an aqueous sodium hydroxide solution in a substantially non-polar organic liquid which forms a two-phase system with water. When both $Y^2$ and $Y^3$ are hydrogen, $R^7$ is saturated but when both are (O=)C—Cl, $R^7$ is saturated or unsaturated. The $R^7$ radicals may be considered as being derived from dicarboxylic acids such as adipic, pimelic, fumaric, maleic, and cyclohexane-1,3-dicarboxylic acids and the unsubstituted and substituted terephthalic and isophthalic acids. The details of preparation are similar to those for preparing cyclic polycarbonate oligomer mixtures as described in U.S. Pat. No. 4,644,053.

It will be apparent from the foregoing that at least one of the compounds of formulas VI and VII must be a bischloroformate. The bischloroformates comprise a major proportion of the compounds of said formulas, at least about 90% of the total number of $Y^2$ and $Y^3$ moieties being chloroformate moieties. Any remaining compounds of said formulas are dihydroxy compounds, preferably bisphenols.

When the bisphenol is free 6,6'-dihydroxy-3,3,3'3'-tetramethylspiro(bis)indane (hereinafter SBI), a minor proportion of tetrahydrofuran is added to ensure its dissolution in the reaction mixture.

The proportions of compounds of formulas VI and VII in the reaction mixture will depend on whether the cyclic composition being prepared is a homo-polycarbonate (whereupon only the compound of formula VI will be used) or a co-polycarbonate.

Any bischloroformates may be employed in substantially pure, isolated form but suitable crude bischloroformate products may be prepared by any of the known methods for bischloroformate preparation. Typically, at least one bisphenol (and, for the preparation of copolycarbonates, a mixture of bisphenols such as those of bisphenol A and SBI) is reacted with phosgene in the presence of a substantially inert organic liquid, as disclosed in the following U.S. Pat. Nos. 3,255,230; 3,966,785; 3,312,661 and 3,974,126.

SBI bischloroformate compositions may also be prepared by passing phosgene into heterogeneous mixture of solid SBI, methylene chloride, and an aqueous sodium hydroxide solution (about 0.2–10 M) said mixture being maintained at a temperature within the range of about 10–40° C. and at a pH of the aqueous phase in the range of about 8–14 until all solids have dissolved and then continuing phosgene passage until the pH has decreased to about 2–5. Traces of base are washed out.

The oleophilic tertiary amines contain at least about 6 and preferably about 6–14 carbon atoms and are highly active in organic media. Intimate contact between the amine and the compounds of formulas VI and VII is essential for the formation of the macrocyclic oligomer composition. Triethylamine is effective in the preparation of products containing low percentages of linear oligomers and high polymers.

The macrocyclic polycarbonate oligomers may be prepared by using an amine which, under the reaction conditions, dissolves preferentially in the organic phase of the reaction system, and gradually adding the bischloroformates and at least a portion of the amine and base simultaneously to the organic liquid or to a mixture thereof with water, said liquid or mixture being maintained at a temperature in the range of about 0°–50° C.; the amount of bischloro-formates used being up to about 0.7 mole for each liter or organic liquid present in the reaction system, and the total molar proportions of amine and base to bischloroformates being 0.06–2.0:1 and 2–3:1, respectively. The concentration of available amine is maintained at a level as constant as possible during the entire bischloroformate addition period. The reaction vessel initially contains about 5–30% of total base. The pH of the reaction mixture is about 9–14.

When the reaction has been completed, impurities are removed by conventional operations such as combining the crude product, as a solid or in solution, with a non-solvent for said impurities such as methyl acetate.

Among the macrocylic co-polycarbonates contemplated as being suitable in the coating powders of this invention are the macrocyclic polyphenylene ether-polycarbonates described in Reissue U.S. Pat. No. 34,431.

The amount of ring opening polymerization catalyst is about 0.001–1.0 mole percent based on carbonate structural units in the oligomer. Suitable catalysts include various bases such as lithium phenoxide, lithium 2,2,2-trifluoroethoxide, n-butyllithium, tetramethyl-ammonium hydroxide, and sodium benzoate. Polymers containing alkali metal phenoxide moieties in their structure are also useful as polycarbonate formation catalysts. They are present as end groups on linear polycarbonates having molecular weights of about 8000–20,000 as determined by gel permeation chromatography relative to polystyrene. They are prepared by the reaction of the polymer with an alkali metal base at 200–300° C. Lewis acids such as dioctyltin oxide and bisisopropoxy-titanium bisacetylacetonate (available under the trademark TYZOR AA) and Lewis bases are also useful as polycarbonate formation catalysts. Tetramethylammonium tetraphenylborate is an example of such a Lewis base; it is prepared from tetramethylammonium hydroxide and sodium tetraphenylborate.

The macrocyclic polycarbonate oligomers in the coating powders of this invention are converted to linear polycarbonates in the powder coating by heating the powder to a temperature of from about 200 to about 300° C.

In another embodiment of this invention, from about 0.5 to about 100 mole percent of the bisphenol or other diol may be replaced in the reaction mixtures described by an unsaturated bisphenol such as diallyl bisphenol A to prepare a thermosettable macrocyclic oligomeric polycarbonate for use in a coating powder of this invention.

An unsaturated macrocyclic polycarbonate oligomer in a coating powder is converted to a crosslinked high molecular weight polycarbonate in the powder coating by adding a photoinitiator effective to enable radiation curing of the polycarbonate to the powder, fusing the powder to allow it to flow over the surface of the substrate and exposing the coating to ultraviolet radiation such as that emanating from one or more 600 watt V/H ultraviolet (UV) lamps for about 1 to 10 seconds. The 2,4,6-trimethylbenzoyldiphenyl phosphine oxide sold under the trademark LUCERIN TPO by BASF is an example of such a photoinitiator.

The unsaturated macrocyclic polycarbonate oligomer in a coating powder may also be converted to a crosslinked high molecular weight polycarbonate in the powder coating by adding a thermal initiator sufficient to enable thermal curing of the polycarbonate to the powder, fusing the powder to allow it to flow over the surface of the substrate and heating the coating to about 200–300° C. A peroxide such as the LUPEROX 230XL catalyst sold by Elf Atochem is an example of the thermal initiator.

When radiation curing of a pigmented powder coating or a thick, clear film (e.g., about 2 mils or greater) is desired, thorough curing of the coating down to the substrate may be achieved by adding both types of initiators, thermal and photo, to the powder, applying the powder to the substrate, heating the coating to about 200–300° C., and irradiating the coating as described above.

Polyamides

In another embodiment of this invention, the coating powder comprises a macrocyclic polyamide oligomer corresponding to Formula VIII:

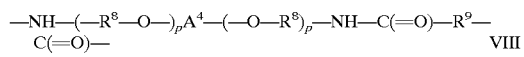

wherein $A^4$ is a spiro(bis)indane moiety of Formula III; $R^8$ is a substituted or unsubstituted $C_{2-4}$ alkylene, m-phenylene, or p-phenylene radical; $R^9$ is a substituted or unsubstituted $C_{2-4}$ alkylene radical or arylene radical other than o-arylene; and p is 0 or 1; or of Formula IX:

wherein $A^5$ is monocyclic or bicyclic m- or p-linked arylene radical, or the radical:

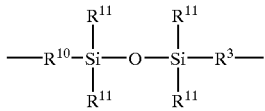

wherein $R^{10}$ is a divalent aliphatic or m- or p-linked monocyclic aromatic or alicyclic radical, and $R^{11}$ is a $C_{1-4}$ primary or secondary alkyl, phenyl, or substituted phenyl.

In the macrocyclic polyamide oligomers corresponding to formula VIII, the $R^8$ radicals are derived from dicarboxylic acids of the formula $R^8(COOH_2)$ and generally contain about 2–8 carbon atoms, about 2–4 thereof usually being in a straight chain. They are illustrated by ethylene, trimethylene and tetramethylene, as well as branched isomers thereof. The arylene radicals generally contain about 6–25 carbon atoms and are illustrated by m-phenylene, p-phenylene, the corresponding tolylene radicals, 4,4'-biphenylene, 1,4-naphthylene, 1,8-naphthylene and divalent phenylindane radicals. Spiro(bis)indane radicals are also included. Any substituent which does not undergo interfering reactions in the context of this invention may be present thereon. Illustrative substituents are halo, nitro, hydroxy and alkoxy.

The macrocyclic polyamide oligomers are prepared from the corresponding diamines and dicarboxylic acid chlorides by gradually adding the dicarboxylic acid chloride to a solution of the diamine in a substantially inert organic liquid at 35°–100° C., said acid chloride and diamine being employed in a molar ratio in the range of about 0.95–1.05:1.

Among the suitable intermediates for the polyamide oligomers are the 6,6'-diamino- and 6,6'-dicarboxy-3,3,3',3'-tetramethyl-bis-1,1'-spiroindanes. Said compounds are known in the art and may be prepared, for example, by oxidation of the corresponding 6,6'-dimethyl compounds to dicarboxylic acids followed, for diamine preparation, by treatment with sodium azide and sulfuric acid as described in Curtis et al., J. Chem. Soc., 1962, 418–421.

Any organic liquid which is substantially inert to the diamines and acid chlorides employed may be used in the preparation of the oligomers. In the case of aromatic diamines, suitable liquids include halogenated alkanes such as methylene chloride and chloroform; aprotic polar solvents such as dimethylformamide, dimethylacetamide and dimethyl sulfoxide; aromatic hydrocarbons and chlorinated aromatic hydrocarbons such as toluene, xylene and chlorobenzene; and ethers such as tetrahydrofuran and ethylene glycol dimethyl ether. Relatively volatile solvents such as methylene chloride, chloroform and tetrahydrofuran are removed by evaporation following completion of the reaction.

The diamine may be initially present in the reaction vessel at a concentration of up to about 0.03 M to optimize the yield of cyclics. Alternatively, both reagents are introduced simultaneously as solutions to said organic liquid.

Suitable hydrogen chloride acceptors such as sodium carbonate, triethylamine and pyridine may be employed. Said acceptor is either in the reaction vessel originally or introduced simultaneously with the acid chloride. The proportion thereof is 1–3 equivalents per calculated equivalent of hydrogen chloride evolved.

The macrocyclic polyamide oligomers are mixtures of oligomers having from 1 to about 15 degrees of polymerization. The individual oligomers are isolated by conventional means such as preparative scale high pressure liquid chromatography. Linear polyamides having a degree of polymerization greater than about 20 formed along with the oligomers are removed by conventional means such as flash chromatography on silica gel. When employing isophthaloyl dichloride and bis-aminophenoxy ethers, cyclics yields of 90% or greater are typical.

The macrocyclic polyamide oligomers in the coating powders are converted to copolyamides by reaction with a lactam in the presence of the basic reagent at an initial temperature of about 25–200° C., preferably about 90–150° C., and finally at 200–300° C.

Any of a number of known lactams may be used. Illustrative lactams are those in which the alkylene chain connecting the carbonyl carbon and the nitrogen atom has from about 4–12 carbon atoms, including pivalolactam, δ-valerolactam, ε-caprolactam and laurolactam.

The ring opening basic reagents include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

The lactam reacts with the basic reagent to form an anionic intermediate, which subsequently reacts with the oligomer composition. The proportions of lactam and oligomer composition may be varied according to the desired stoichiometry of the product.

In a particular embodiment of this invention, a polyamide hybrid is formed on the surface of a substrate by heating a coating powder comprising a macrocyclic polyamide oligomer, an ε-caprolactam-blocked polyisocyanate, a basic reagent, and a compound having an isocyanate reactive functional group. The powder coating process comprises the release of the two components of the caprolactam/polyisocyanate adduct, the ring opening polymerization of the macrocyclic oligomer by the caprolactam, and the formation of a polyurethane, a polyurea, a polyamide or a polyimide by the reaction of the unblocked polyisocyanate with the appropriate polyol, polyamine, or polycarboxylic acid.

Polyamides and Polyamideimides

In another embodiment of this invention, the coating powder comprises a macrocyclic polyimide and a ring opening polymerization agent. As used herein, the term polyimide means a polyimide having Formula X:

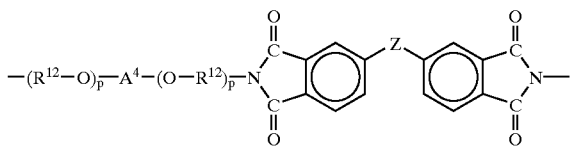

wherein p is 0 or 1; $R^{12}$ is a substituted or unsubstituted $C_{2-4}$ alkylene, m-phenylene, or p-phenylene radical, $A^4$ is a spiro(bis)indane moiety of Formula III, and Z is sulfur or a siloxane group having the formula

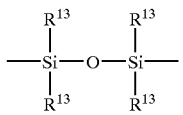

wherein $R^{13}$ is a $C_{1-4}$ primary or secondary alkyl, phenyl, or substituted phenyl radical.

The macrocyclic polyimide oligomers are prepared by reacting an appropriate diamine with an appropriate tetracarboxylic acid or a dianhydride thereof.

The spiro(bis)indane diamines and tetracarboxylic acids and their derivatives are particularly susceptible to formation of cyclic products upon reaction with dianhydrides. Therefore, it is not generally necessary to employ high dilution or other unusual reaction conditions. Approximately equimolar proportions of diamine and dianhydride are heated at a temperature in the range of about 120°–250° C. with water of reaction being removed by distillation. It is frequently preferred to employ a relatively high boiling organic solvent, typically a chlorinated aromatic hydrocarbon such as dimethyl sulfoxide or dimethylacetamide.

Macrocyclic polyimides containing a disiloxane group are polymerized by the action of methanesulfonic acid as a ring-opening catalyst. It is also possible to incorporate a cyclic polysiloxane such as cyclooctamethyltetrasiloxane in the polymerization mixture to increase the molecular weight of the polysiloxane blocks in the linear polyimide product.

The proportion of catalyst in the mixture, based on macrocyclic polyimide and cyclic polysiloxane present, may vary widely and is typically about 0.001–10.0 mole percent. Polymerization temperatures are typically in the range of about 125°–200° C.

In another embodiment of this invention, the coating powder comprises a macrocyclic polyamideimide and a ring opening polymerization agent. As used herein, the term polyamideimide means a polyimide having Formula XI:

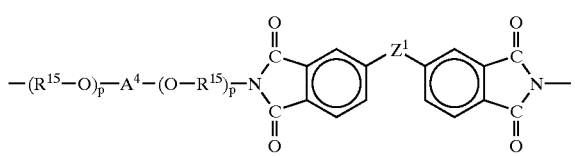

XI wherein p is 0 or 1; $A^4$ is a spiro(bis)indane moiety of Formula III, $R^{15}$ is a substituted or unsubstituted $C_{2-4}$ alkylene, m-phenylene, or p-phenylene radical, and $Z^1$ has the formula

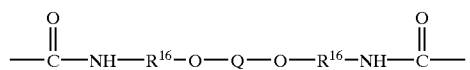

wherein Q is a divalent saturated or unsaturated aliphatic radical or an aromatic radical, and $R^{16}$ is a divalent saturated or unsaturated $C_{2-4}$ alkylene radical, a m-phenylene, or p-phenylene radical; or a polyimide having Formula XII:

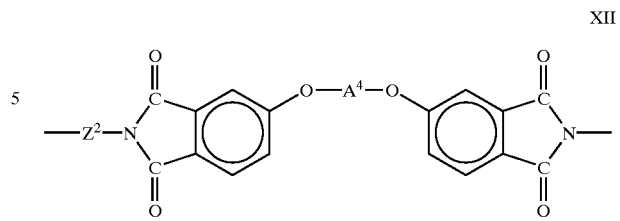

XII wherein $A^4$ is a spiro(bis)indane moiety of Formula III, and $Z^2$ is —$R^{17}$—$Z^3$—$R^{17}$— wherein $Z^3$ is —C(=O)—NH and $R^{17}$ is a divalent saturated or unsaturated $C_{2-4}$ alkylene radical, a m-phenylene, or p-phenylene radical; or the siloxane

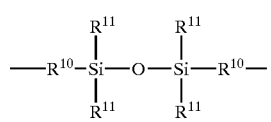

wherein $R^{10}$ and $R^{11}$ are as defined above.

Polyamideimides are prepared by methods similar to those employed for the preparation of polyimides, employing a tricarboxylic acid or functional derivative thereof instead of the tetracarboxylic acid, or a diamine containing an amide moiety. The tricarboxylic acid may be aliphatic, alicyclic, or aromatic. Trimellitic anhydride acid chloride (TAAC) is an example of such a functional derivative.

The macrocyclic polyamideimide oligomers in the coating powders are converted to copolyamides by reaction with a lactam in the presence of the basic reagent at an initial temperature of about 25–200° C., preferably about 90–150° C., and finally at 200–300° C.

The lactam reacts with the basic reagent to form an anionic intermediate, which subsequently reacts with the oligomer composition. The proportions of lactam and oligomer composition may be varied according to the desired stoichiometry of the product. Any of a number of known lactams may be used. Illustrative lactams include pivalolactam, δ-valerolactam, ε-caprolactam and laurolactam.

The basic reagents include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

An advantage of macrocyclic polyimide oligomers in which Z is a disiloxane moiety, or macrocyclic polyamideimide oligomers in which $Z^2$ contains a disiloxane moiety is that these functionalities optimize the ease of converting said macrocyclic oligomers to linear polyimides.

The coating powder of this invention may also contain a flow control agent in the range of from about 0.5 to about 2.0 phr. Examples of the flow control agents include the MODAFLOW poly(alkylacrylate) products. Flow control agents containing functional groups may not be used in the coating powders of this invention because of their interference with the conversion of the macrocyclic oligomers to linear polymers. Anti-oxidants may also be used at a concentration of from about 0.5 to about 2.0 phr to prevent the discoloration of the coatings at the high temperatures suitable for the purposes of this invention. Examples of the anti-oxidants that are useful in this invention include sodium hypophosphite, tris-(2,4-di-t-butyl phenyl) phosphite (sold under the trademark IRGAFOS 168), and calcium bis [(monoethyl(3,5-di-t-butyl-4-hydroxybenzyl)phosphonate] (sold under the trademark IRGANOX 1425). Mixtures of anti-oxidants may be used. The sodium hypophosphite also acts a buffer against the action of trace amounts of chlorine released by epichlorohydrin residues in the epoxy resins.

Pigments, optical brighteners, matting agents, fillers such as calcium carbonate and bentonite clays, texturizing agents and other conventional additives may also be present. The coating powder of this invention may be used for coating glass, ceramics, wood, paper, and graphite-filled composites as well as metallic substrates such as aluminum and steel in the form of sheet metal, rebars, pipelines, cold coil springs, strapping, and other articles.

The high temperature portion of the powder coating process of this invention may be carried out while the substrate is in an atmosphere of air or an inert gas, preferably nitrogen. The coating powder may be applied by any of the conventional powder coating methods such as by electrostatic spraying of an article by a triboelectric gun or by passing the article through a corona discharge cloud. The article may be hot or cold before being sprayed with the powder electrostatically or passed through a corona discharge cloud but the powder is heated on the surface of the substrate to a temperature of from about 160 to about 300° C., then either cooled or cured to return to the solid state. In the fluidized bed process of this invention, the article is heated to a temperature of from about 160 to about 300° C. before being passed through powder fluidized by the passing of air or an inert gas such as nitrogen through a porous plate at the bottom of a container of the coating powder. The air or inert gas may be passed through a filter and either recycled to the container or passed out of the system. Powder coatings applied by the electrostatic means may have a thickness of from 1 mil to 10 mils or greater. The film thickness of a powder coating of this invention may be from about 10 to as much as about 100 mils or even higher when applied in a fluidized bed. The maximum particle size of powders used in the electrostatic processes is usually on the order of about 75–100 microns (140–200 mesh) whereas for those used in fluid beds it is much coarser.

The structure, preparation, and polymerization of macrocyclic oligomers are taught in a series of U.S. patents, including U.S. Pat. Nos. 5,668,186; 4,644,053; Re 34,431; 4,829,144; 5,446,122; 5,214,158; 5,407,984; 5,039,783; 5,321,117; 5,661,214; 5,648,454; 4,757,132; 5,498,651, and 4,126,592, all of which are incorporated herein by reference.

The invention is more specifically described in the following working examples.

EXAMPLE 1

Preparation of Macrocyclic Butylene Terephthalate Oligomer

A 50 ml flask is charged with 880 grams of poly(1,4-butylene terephthalate) having a weight average molecular weight of 105,000, based on polystyrene, and 40 ml of o-dichlorobenzene. The solution is heated to 190° C. before adding 0.35 gram of a stannoxane catalyst having the formula:

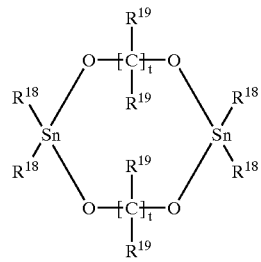

wherein t=2, $R^{18}$=butyl, and $R^{19}$=hydrogen. Equilibrium is reached after one hour at 190° C. The solution is then cooled to about 75° C. to precipitate unconverted linear polymer which is then removed by filtration. The desired macrocyclic oligomer is recovered from the filtrate by evaporation of the solvent and is incorporated in a thermoplastic coating powder as follows.

Preparation of Coating Powder

The macrocyclic polyester oligomer prepared as given above and the other components listed in the following table are blended, the mixture is melt-mixed in an extruder at 120° C. and formed into sheets as the melt is forced out of the extruder through a die. The sheets are cooled to a friable state and broken into chips. A mixture of the chips and 0.3 gram of aluminum oxide C is then ground to a powder and screened at 140 mesh.

| Components | Amount (grams) |
| --- | --- |
| Macrocyclic polyester oligomer | 100.0 |
| TYZOR TE catalyst (Dupont) | 0.3 |
| ARALDITE GT 7074 resin (Ciba-Geigy) | 0.2 |
| RESIFLOW P-67 flow aid (Estron) | 1.4 |
| Benzoin | 1.0 |
| Barium sulfate | 20.0 |
| Raven black 1255 pigment | 3.0 |

The coating powder is electrostatically sprayed onto a steel panel and the panel is placed in an oven for 20 minutes at 160–300° C. to give a satisfactory thermoplastic coating on the panel.

EXAMPLE 2

Preparation of Unsaturated Macrocyclic Co-polyester Oligomer

A solution of 20.3 grams (10 mmol.) of isophthaloyl chloride in 10 ml of methylene chloride is added with stirring in a 30 minute period to a mixture of 2.36 grams (8.8 mmol.) of 2-allyl-bisphenol A, 680 mg (2.2 mmol) of 6,6'-dihydroxy-3,3,3',3'-tetramethyl-spiro(bis)indane 880 mg (22 mmol) of sodium hydroxide, 32 mg of tetra-n-butylammonium bromide, 20 ml of methylene chloride and 5 ml of water. The mixture is held at reflux temperature for about 5 minutes. The aqueous phase is separated from the organic phase and washed with methylene chloride. The methylene chloride extract is combined with the organic phase and washed with aqueous hydrochloric acid solution, aqueous sodium chloride solution, and water. Upon evaporation of the methylene chloride, an unsaturated macrocyclic copolyester oligomer is obtained.

The unsaturated macrocyclic polyester oligomer prepared as given above and the other components listed in the following table are blended, the mixture is melt-mixed in an extruder at 120° C. and formed into sheets as the melt is forced out of the extruder through a die. The sheets are cooled to a friable state and broken into chips. A mixture of the chips and 0.3 gram of aluminum oxide C is then ground to a powder and screened at 140 mesh.

| Components | Amount (grams) |
|---|---|
| Macrocyclic unsaturated polyester oligomer | 100.0 |
| LUPEROX 230XL catalyst (Elf Atochem) | 0.3 |
| ARALDITE GT 7074 resin | 0.2 |
| TYZOR TE catalyst | 0.3 |
| RESIFLOW P-67 flow aid | 1.4 |
| Benzoin | 1.0 |
| Barium sulfate | 20.0 |

The coating powder is electrostatically sprayed onto a steel panel and the panel is placed in an oven for 20 minutes at 160–300° C. The resulting coating on the panel is satisfactory.

EXAMPLE 3

Preparation of Hydroxyl-containing Copolymeric Linear Polyester

A mixture of 30 grams (0.15 mole) of dimethyl terephthalate, 20 grams (0.22 mole) of butanediol, 10.9 grams (0.06 mole) of 5-hydroxy isophthalic acid, and 11 grams of tetra(2-ethylhexyl)titanate is heated to about 250° C. at a pressure of about 0.2 mm Hg.

Preparation of Hydroxyl-containing Macrocyclic Co-polyester Oligomer

To a solution of 40 grams of the linear ester in 300 ml of o-dichlorobenzene at 190° C. there is added 3 grams of a stannoxane catalyst of Example 1. The solution is then cooled to about 75° C. and filtered. The desired hydroxyl-containing macrocyclic oligomer is recovered from the filtrate by evaporation of the solvent and is incorporated in a thermoplastic coating powder as follows.

Preparation of Coating Powder

The macrocyclic oligomer prepared as given above and the other components listed in the following table are blended, the mixture is melt-mixed in an extruder at 120° C. and formed into sheets as the melt is forced out of the extruder through a die. The sheets are cooled to a friable state and broken into chips. A mixture of the chips and 0.3 gram of aluminum oxide C is then ground to a powder and screened at 140 mesh.

| Components | Amount (grams) |
|---|---|
| Macrocyclic oligomer | 100.0 |
| TYZOR TE catalyst | 0.3 |
| ARALDITE GT 7074 resin | 50.0 |
| RESIFLOW P-67 flow aid | 0.4 |
| Benzoin | 1.0 |
| Barium sulfate | 20.0 |
| Raven black 1255 pigment | 3.0 |

The coating powder is electrostatically sprayed onto a steel panel and the panel is placed in an oven for 20 minutes at 160–300° C. to give a satisfactory thermoplastic coating on the panel.

The subject matter claimed is:

1. A coating powder composition comprising a macrocyclic oligomer, a flow control agent, and a ring-opening polymerization agent, wherein the oligomer is a polyamide, polyimide or polyamideimide, and the ring-opening polymerization agent is a lactam in combination with a basic reagent selected from the group consisting of tetraalkylammonium hydroxides, guanidines, grignard reagents, organolithium reagents, alkali earth metals and their hydrides, hydroxides, carbonates, alkoxides, and alkaline earth metals and their hydrides.

2. A coating powder composition comprising a macrocyclic oligomer, a flow control agent, and a ring-opening polymerization agent, wherein the oligomer is a polyimide containing a disiloxane group and the ring-opening polymerization agent is methanesulfonic acid.

3. A coating powder composition comprising a macrocyclic oligomer, a flow control agent, and a ring-opening polymerization agent, wherein the oligomer is a polycarbonate and the ring-opening agent is selected from the group consisting of lithium 2,2,2-trifluoroethoxide, n-butyllithium, tetramethyl-ammonium hydroxide and sodium benzoate.

4. A coating powder composition comprising a macrocyclic oligomer, a flow control agent, and a ring-opening polymerization agent, wherein the oligomer is a macrocyclic polyester and the ring-opening agent is selected from the group consisting of non-sterically hindered amines, trialkylamines, heteroaromatic tertiary amines, heterocyclic amines, tertiary amines and quaternary ammonium salts.

5. The coating powder composition of claim 4 wherein the macrocyclic polyester is a reaction product of a linear polyester and an organotin compound.

6. A coating powder composition comprising a macrocyclic oligomer, a flow control agent, and a ring-opening polymerization agent, wherein the oligomer is a macrocyclic copolyester that is the reaction product of a linear polyester and an organotin compound, and the ring-opening agent is selected from the group consisting of tin alkoxides, organotin compounds, titanate esters, metal acetylacetonates, alkali metal hydroxides, alkali metal salicylates, alkali metal alkoxides, alkali metal phenoxides, and phosphines.

7. A coating powder comprising a macrocyclic polyester oligomer, a flow control agent, and a ring-opening agent selected from the group consisting of non-sterically hindered amines, trialkylamines, heteroaromatic tertiary amines, heterocyclic amines, tertiary amines, quaternary ammonium salts, tin alkoxides, organotin compounds, titanate esters, metal acetylacetonates, and basic reagents selected from the group consisting of alkali metal hydroxides, alkali metal salicylates, alkali metal alkoxides, alkali metal phenoxides, and phosphines.

* * * * *